United States Patent
Shirato

(10) Patent No.: US 9,751,551 B2
(45) Date of Patent: Sep. 5, 2017

(54) PUSHCART

(71) Applicant: Murata Manufacturing Co., Ltd., Kyoto (JP)

(72) Inventor: Kenichi Shirato, Kyoto (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 50 days.

(21) Appl. No.: 15/058,749

(22) Filed: Mar. 2, 2016

(65) Prior Publication Data

US 2016/0176429 A1 Jun. 23, 2016

Related U.S. Application Data

(63) Continuation of application No. PCT/JP2014/072674, filed on Aug. 29, 2014.

(30) Foreign Application Priority Data

Sep. 4, 2013 (JP) ................ 2013-183389

(51) Int. Cl.
*B62B 3/02* (2006.01)
*A61H 3/04* (2006.01)
(Continued)

(52) U.S. Cl.
CPC ............ *B62B 5/0069* (2013.01); *A61H 3/04* (2013.01); *B62B 1/00* (2013.01); *B62B 5/0033* (2013.01); *B62B 5/02* (2013.01); *A61H 2003/043* (2013.01); *A61H 2003/046* (2013.01); *A61H 2201/5007* (2013.01); *A61H 2201/5028* (2013.01); *A61H 2201/5069* (2013.01);
(Continued)

(58) Field of Classification Search
CPC .... B62B 3/02; B62B 1/10; B62B 5/02; A61H 3/04; G05D 1/08
USPC ......................................................... 701/22
See application file for complete search history.

(56) References Cited

U.S. PATENT DOCUMENTS

| 7,367,432 | B2 * | 5/2008 | Chen .................... B62B 7/08 188/19 |
| 2011/0118968 | A1 * | 5/2011 | Takenaka ................ B62K 1/00 701/124 |
| 2013/0306120 | A1 | 11/2013 | Fukunaga et al. |

FOREIGN PATENT DOCUMENTS

JP 2009-183407 A 8/2009
JP 4344655 B2 10/2009
(Continued)

OTHER PUBLICATIONS

English translation of Written Opinion for PCT/JP2014/072674 dated Nov. 25, 2014.
(Continued)

*Primary Examiner* — Tan Q Nguyen
(74) *Attorney, Agent, or Firm* — Pearne & Gordon LLP

(57) ABSTRACT

A pushcart configured to perform inverted pendulum control is made likely to negotiate a step.
In a first control mode, a main body is maintained to have a constant posture by performing the inverted pendulum control all the time. For example, when a user operates a selector switch, the control mode is changed to a second control mode in which offset torque is added so that an amount of torque applied to a wheel driver unit becomes larger. In this case, because the pushcart moves faster than usual, even if there exists a step that is hard to negotiate in the state of usual inverted pendulum control, the pushcart is likely to negotiate that step.

20 Claims, 14 Drawing Sheets

(51) Int. Cl.
*B62B 5/00* (2006.01)
*B62B 5/02* (2006.01)
*B62B 1/00* (2006.01)
G01D 1/08 (2006.01)
*B62B 1/10* (2006.01)

(52) U.S. Cl.
CPC ............. *A61H 2201/5084* (2013.01); *A61H 2201/5092* (2013.01); *B62B 1/10* (2013.01)

(56) References Cited

FOREIGN PATENT DOCUMENTS

| | | |
|---|---|---|
| JP | 2011-168236 A | 9/2011 |
| WO | 2012114597 A1 | 8/2012 |

OTHER PUBLICATIONS

International Search Report for PCT/JP2014/072674 dated Nov. 25, 2014.
Written Opinion for PCT/JP2014/072674 dated Nov. 25, 2014.

\* cited by examiner

PUSHCART

BACKGROUND

Technical Field

The present disclosure relates to pushcarts provided with wheels, and particularly relates to pushcarts configured to drive and control the wheels.

Mobile bodies that drive and control wheels while performing inverted pendulum control have been known (for example, see Patent Document 1).

Patent Document 2 discloses a 4-wheel walking aid cart including an auxiliary wheel connected to a front wheel of each of casters via a spring. The spring in the 4-wheel walking aid cart disclosed in Patent Document 2 is expanded when there exists a step so that the auxiliary wheel first rides over the step, whereby the cart is made likely to negotiate the step.

Patent Document 1: Japanese Unexamined Patent Application Publication No. 2011-168236

Patent Document 2: Japanese Patent No. 4344655

BRIEF SUMMARY

In a mobile body configured to perform inverted pendulum control, there is an issue that the mobile body has difficulty in negotiating a step because a large load is exerted on the wheel being driven.

Meanwhile, in the apparatus as disclosed in Patent Document 2, in the case where loads exerted on the right and left wheels are different from each other, only one caster can rise to a higher position. Accordingly, there is a possibility that the apparatus undesirably falls over.

The present disclosure provides a pushcart configured to perform inverted pendulum control to be likely to negotiate a step.

A pushcart according to the present disclosure includes a wheel, a driver unit for driving the wheel, a controller for controlling operations of the driver unit, a main body configured to support the wheel in a rotatable manner, a holding portion provided on the main body, a first sensor unit for detecting an angle change or an angular velocity change in a slope angle of the main body in a pitch direction, and a step detection input unit configured to receive information of presence/absence of step detection.

The controller has a first control mode in which the operations of the driver unit are controlled so that the angle change in the slope angle of the main body in the pitch direction relative to a target value becomes 0 based on output of the first sensor unit and a second control mode in which torque applied to the driver unit is large in comparison with the first control mode, and switches between the first control mode and the second control mode based on output of the step detection input unit.

In the first control mode, a posture of the main body is maintained upright in a vertical direction or a direction near the vertical direction through inverted pendulum control. In the first control mode, the pushcart is in a self-supporting state. Further, in the first control mode, when information on presence of a step is inputted by using a switch, for example, the control mode is changed to the second control mode in which torqued applied to the driver unit is made larger. In this case, since the pushcart moves faster than usual, even if there exists a step hard to be negotiated in a usual inverted pendulum control state, the pushcart is likely to negotiate the step.

In the second control mode, the main body can have a forward tilting posture by resetting the target value of the slope angle of the main body in the pitch direction toward a forward direction side in a travelling direction of the pushcart. When the forward tilting posture is taken, torque that causes the wheel to move forward is made to act by the inverted pendulum control. As such, this torque allows the pushcart likely to negotiate the step. Further, in the case where the pushcart moves faster than usual, there is a possibility that the pushcart takes a backward tilting posture when negotiating the step. Accordingly, taking the forward tilting posture brings an effect in that the pushcart takes a posture upright in the vertical direction or a direction near the vertical direction after having negotiated the step. Note that, in this case, offset torque can be applied after having reset the target value of the slope angle of the main body in the pitch direction and having changed the posture of the pushcart to the forward tilting one.

The following aspect can also be realized. That is, at a time of transition from the first control mode to the second control mode, the inverted pendulum control is stopped for a constant time, the pushcart is made to proceed backward, and thereafter the transition to the second control mode is carried out. A user always holds the holding portion with his/her hands when walking. Accordingly, in the case where the inverted pendulum control is stopped for a constant time and the pushcart is made to proceed backward, the position of the holding portion in the travelling direction is unchanged and only the wheels proceed backward, thereby making it possible for the main body to take a forward tilting posture.

The step detection input unit receives input, from a switch or the like, for example, that informs of presence of a step. The switch may be a plurality of push button type switches provided in the holding portion or a rotary type switch using a potentiometer or an encoder provided in the holding portion. Note that these switches can return to their initial states after the step detection input has been received. A method for the switch to return to the initial state can be realized by a built-in elastic member such as a spring, for example.

An aspect in which the step detection input unit is a second sensor unit for detecting a step can also be realized. In order to detect a step, a distance measurement sensor such as an ultrasonic sensor, an infrared sensor, or the like, a shock sensor for detecting a shock when the wheel bumps against a step, an acceleration sensor, an angular velocity sensor, a slope angle sensor, or the like is used, for example.

It is also possible for the second sensor unit to include a wheel stop detection unit for detecting the wheel being stopped. In order to detect the wheel being stopped, rotation of the wheel is detected by using a rotary encoder, for example. The wheel stop detection unit determines that the wheel is stopped in the case where an output value of the rotary encode is 0 or a sudden change is detected. Further, in the case where the second sensor unit is a distance measurement sensor, the controller can determine, based on a distance to the step detected by the distance measurement sensor, whether or not the detected step is negotiable.

Further, the second sensor unit can be a step height detection sensor for detecting a height of a step existing in the travelling direction. In this case, when the step height detection sensor detects a step whose height is equal to or higher than a predetermined threshold, the controller determines that there exists a step and switches from the first control mode to the second control mode.

Furthermore, in the case where it is determined that there exists a step, the controller can determine whether or not the step is negotiable based on the height information of the step detected by the step height detection sensor, and that the controller switch from the first control mode to the second control mode only when the step is determined to be negotiable.

In the case where the distance to the step detected by the distance measurement sensor falls within a predetermined range, the controller can switch from the first control mode to the second control mode.

According to the present disclosure, a pushcart configured to perform inverted pendulum control can be made likely to negotiate a step.

DETAILED DESCRIPTION

Figure 1:
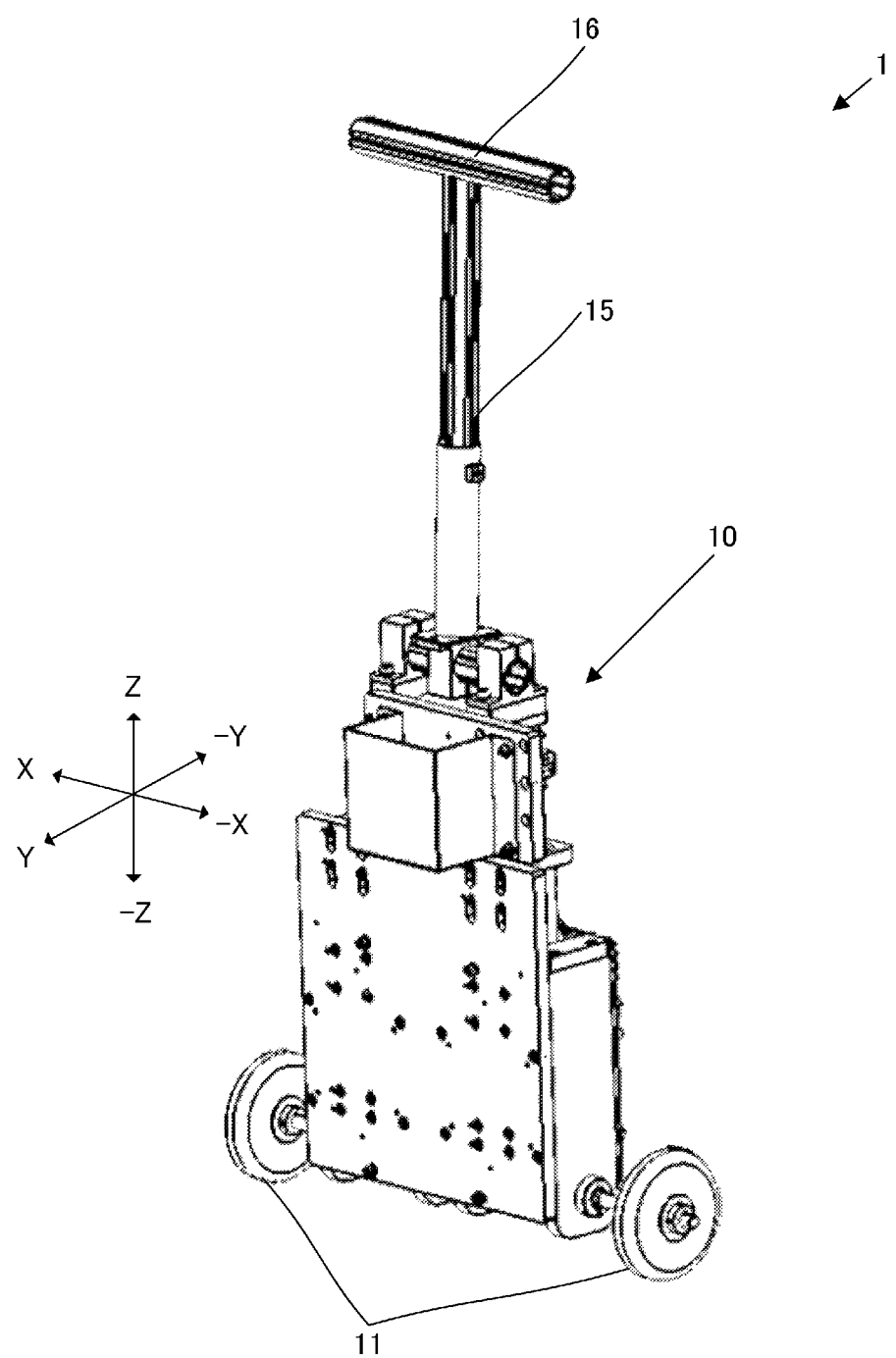
FIG. 1 is an external appearance of a pushcart.
Figure 2:
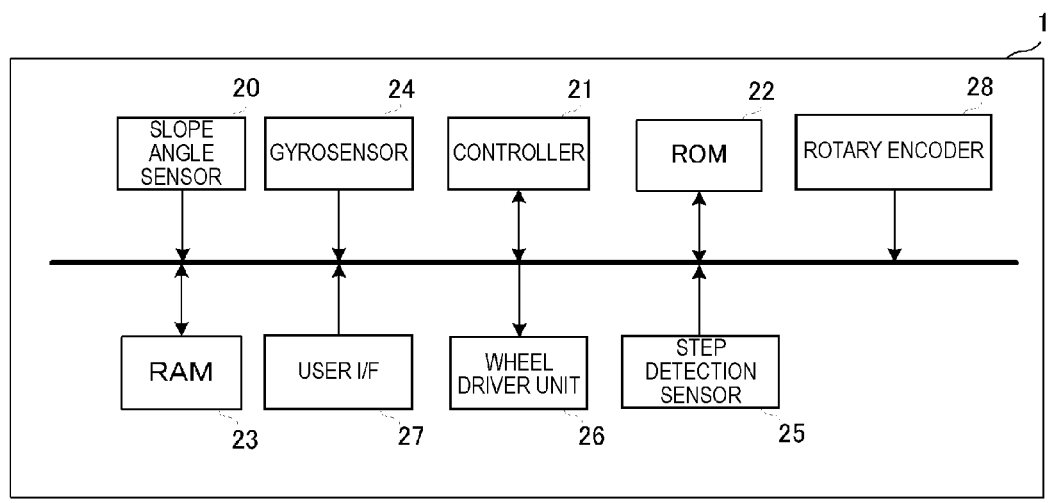
FIG. 2 is a control configuration diagram illustrating the configuration of a pushcart.

FIG. 1 is an external appearance of a pushcart 1 according to an embodiment of the present disclosure. FIG. 2 is a block diagram illustrating the configuration of the pushcart 1.

The pushcart 1 includes a main body 10 formed in a rectangular parallelepiped shape, for example. The shape of the main body 10 is longer in a vertical direction (Z and −Z directions in the drawing) and shorter in a depth direction (Y and −Y directions in the drawing). A substrate for controlling, a battery, and the like are mounted inside the main body 10.

Two wheels 11 are attached to left and right end portions (in X and −X directions in the drawing) of a lower section of the main body 10 in a downward vertical direction (−Z direction). The two wheels 11 are attached to the same shaft and rotate in synchronization with each other. However, the two wheels can also be driven and rotated separately. Although an example of the wheels 11 being a twin type is described in the present embodiment, the number of wheels may be one or no less than three.

On an upper section of the main body 10 in a vertical direction, one end of a supporting pole 15 formed in a circular cylinder shape is attached, for example, and a grip 16 formed in a T shape is attached to the other end of the supporting pole 15. In an upper surface of the grip 16, a user interface (a user I/F 27 shown in FIG. 2) including a power switch and the like is provided. A user holds the grip 16 or places the forearms or the like on the grip 16 to use the pushcart 1 with friction between the grip and the forearms or the like.

In actuality, a cover is attached to the main body 10 so that a substrate and the like mounted inside cannot be seen from the exterior.

Next, the configuration and the basic operations of the pushcart 1 will be described. As shown in FIG. 2, the pushcart 1 includes a slope angle sensor 20, a controller 21, a ROM 22, a RAM 23, a gyrosensor 24, a step detection sensor 25, a wheel driver unit 26, the user I/F 27, and a rotary encoder 28.

The controller 21 is a functional unit, for integrally controlling the pushcart 1, which reads out programs stored in the ROM 22 and loads those programs in the RAM 23, thereby realizing various types of operations. The slope angle sensor 20 detects a slope angle of the main body 10 in a pitch direction (rotational direction about the shaft of the wheels 11 in FIG. 1) relative to the vertical direction and outputs the detected result to the controller 21. The gyrosensor 24 detects an angular velocity of the main body 10 in the pitch direction and outputs the detected result to the controller 21. The rotary encoder 28 outputs an output value corresponding to a rotational angle of the wheel 11 to the controller 21. The step detection sensor 25 is a sensor that detects a step existing in the travelling direction of the pushcart 1 and is formed of, for example, an ultrasonic sensor, an infrared sensor, a shock sensor, an acceleration sensor, an angular velocity sensor, a slope angle sensor, or the like.

Figure 3:
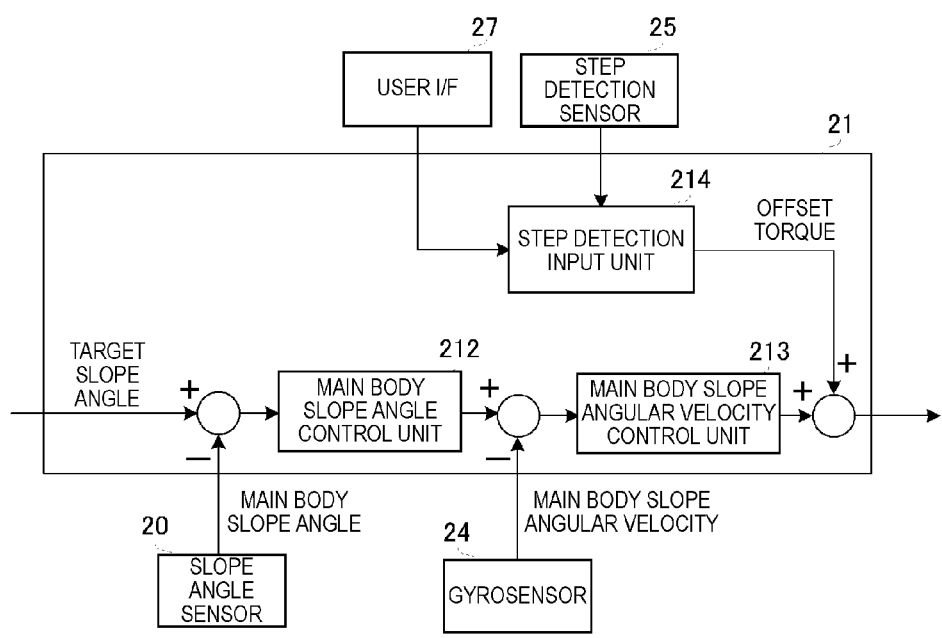
FIG. 3 is a block diagram illustrating a functional configuration of a controller 21.

FIG. 3 is a block diagram illustrating a functional configuration of the controller 21. The controller 21 includes a main body slope angle control unit 212, a main body slope angular velocity control unit 213, and a step detection input unit 214 serving as functional units. The main body slope angle control unit 212 inputs a differential value between a target slope angle (for example, 0 degree) and a current slope angle of the main body 10 inputted from the slope angle sensor 20, and then calculates such a slope angular velocity of the main body 10 that makes the above difference value become 0. Subsequently, the main body slope angular velocity control unit 213 inputs a difference value between the slope angular velocity calculated by the main body slope angle control unit 212 and a current slope angular velocity of the main body 10 inputted from the gyrosensor 24, and then calculates such an application torque that makes the difference value become 0. The toque calculated in this manner is inputted to the wheel driver unit 26.

In FIG. 2, the wheel driver unit 26 is a functional unit that drives a motor for rotating the shaft attached to the wheels 11, and applies the torque calculated by the main body slope angular velocity control unit 213 to the motor of the wheels 11 so as to rotate the wheels 11.

As discussed above, the pushcart 1 performs inverted pendulum control, as a first control mode, to control the main body 10 to maintain its posture constant. In a case in which a user takes action to push the pushcart 1 toward a forward direction side in the travelling direction, because the slope angle of the main body 10 is inclined toward the forward direction side relative to the target slope angle, such torque acts that causes the wheels 11 to rotate in the forward direction in order to maintain the slope angle of the main body 10 at the target slope angle. This makes the pushcart 1 move following the movement of the user.

Although an example in which the gyrosensor 24 and the slope angle sensor 20 are used as a method for detecting an angle change in the slope angle of the main body 10 in the pitch direction is described herein, an acceleration sensor can also be used and further any type of sensor may be used.

The controller 21 switches between the first control mode and a second control mode depending on presence/absence of a step. That is, in FIG. 3, in the case where the step detection input unit 214 receives an input of the information of step detection from the step detection sensor 25 (or the user I/F 27), the step detection input unit 214 adds offset torque to the aforementioned application torque. Since the controller 21 carries out the second control mode in which the offset torque is added, the pushcart 1 moves faster than in the case of usual inverted pendulum control. Because of this, even if there exists a step hard to be negotiated in the usual inverted pendulum control state, the pushcart is likely to negotiate that step.

Figure 4A:
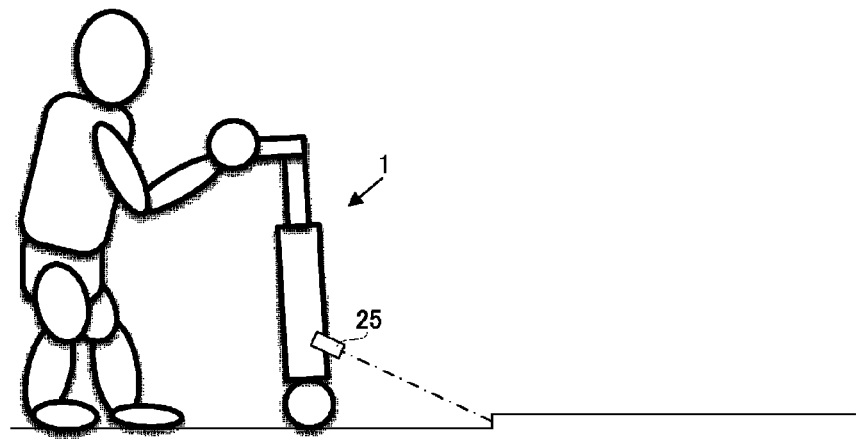
FIGS. 4A-4C include descriptive diagrams schematically illustrating operations of a pushcart when negotiating a step.
Figure 4B:
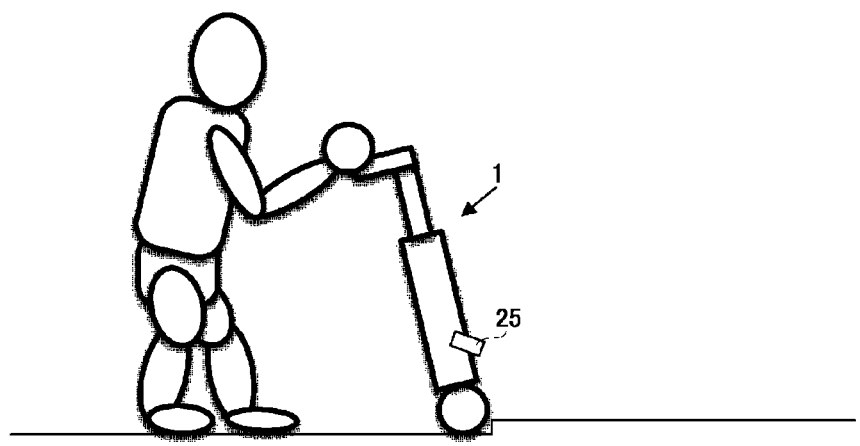
Figure 4C:
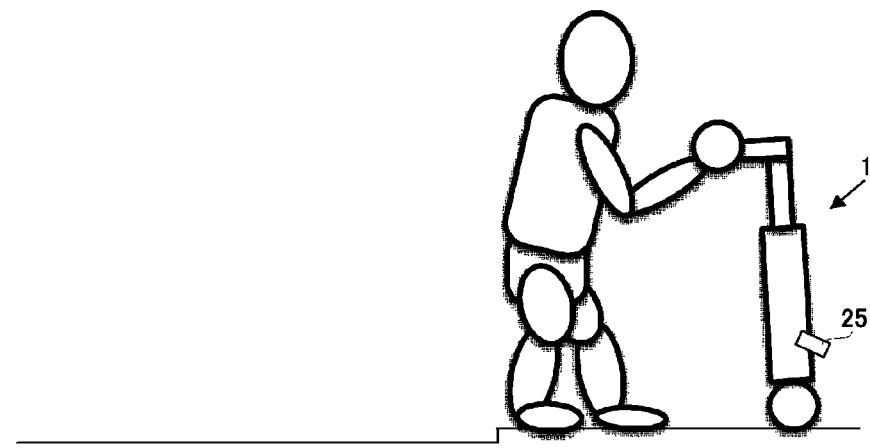
Figure 5:
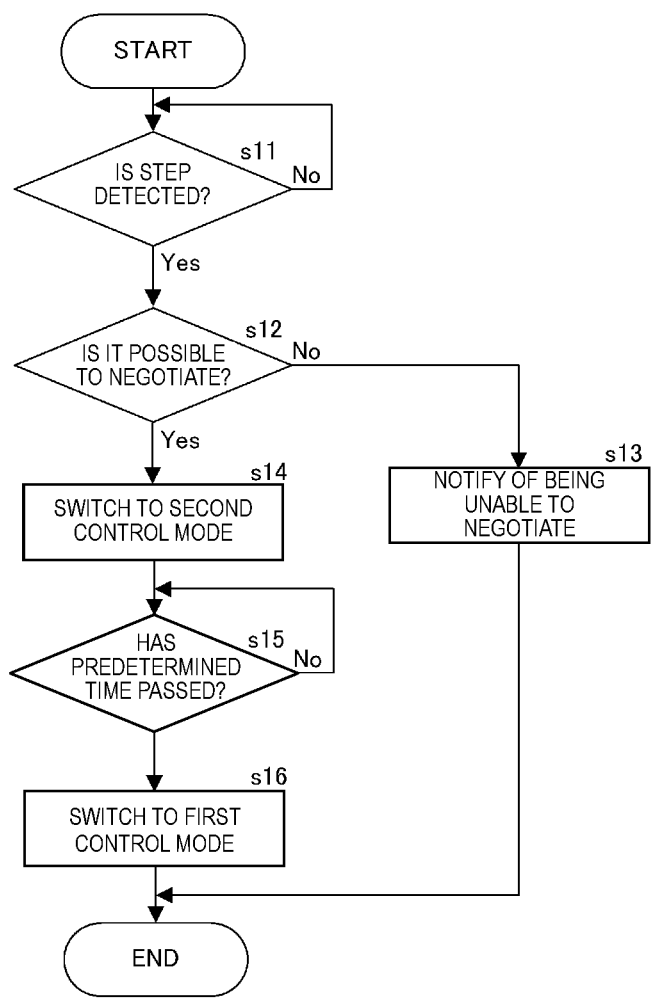
FIG. 5 is a flowchart illustrating operations of a pushcart when negotiating a step.

FIGS. 4A-4C include descriptive diagrams schematically illustrating operations of the pushcart 1 when negotiating a step. FIG. 5 is a flowchart illustrating operations of the pushcart 1 when negotiating a step. As shown in FIG. 4A, the controller 21 usually carries out the first control mode in which inverted pendulum control is made available. Then, in the case where the step detection sensor 25 detects a step (s11), the controller 21 determines whether or not the step has a negotiable height (s21). Note that, however, the processing of s12 is not absolutely necessary and may be omitted.

Figure 6:
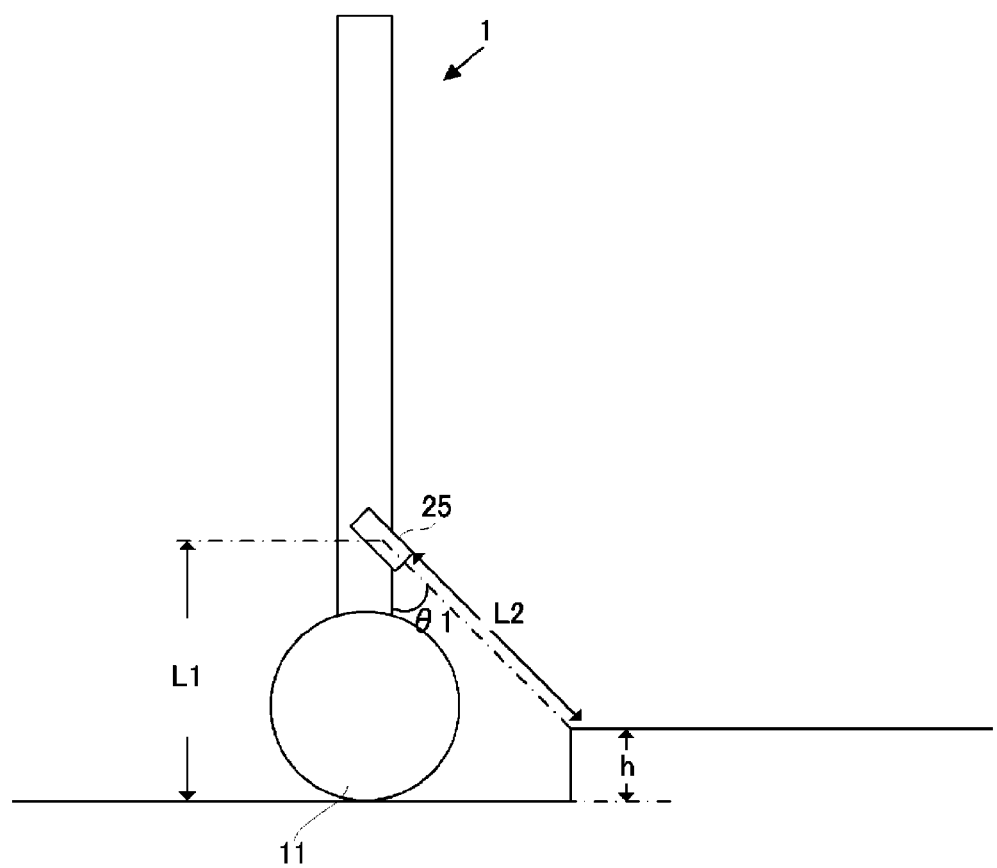
FIG. 6 is a diagram illustrating an example of detecting a height.

FIG. 6 is a diagram illustrating an example of detecting a height. FIG. 6 illustrates an example of a case in which the step detection sensor 25 is an ultrasonic sensor. The step detection sensor 25 measures a distance L2, which is a distance to a ground surface in the travelling direction, based on a time difference between when ultrasonic waves are transmitted and when the reflected waves are received. The controller 21 obtains a height "h" of a step based on the measured distance L2. The height "h" can be calculated based on a formula of h=L1−L2 cos θ1. The controller 21 determines that the step is negotiable if the height "h" is shorter than the radius of the wheel 11; if the height "h" is no less than the radius of the wheel 11, the controller 21 determines that the step is not negotiable. Note that a determining threshold of a negotiable height of a step is affected by restriction of a maximum torque of a motor being used or the like aside from the radius of the tire. As such, a value obtained through experiment having been carried out in advance may be employed as the determining threshold.

Returning to FIG. 5, in the case where the step is determined to be not negotiable, the controller 21 reports to the user, through an LED, LCD, audio, or the like, that the pushcart is unable to negotiate the step (s13), and then ends the operation.

Meanwhile, in the case where the step is determined to be negotiable, the controller 21 switches to the second control mode. With this, the offset torque is added so that the pushcart is made to move faster than in the case of the usual inverted pendulum control immediately in front of the step, as shown in FIG. 4B. As a result, the pushcart is likely to negotiate the step. However, as shown in FIG. 4B, adding the offset torque causes the slope angle of the main body 10 to be temporarily deviated from the target slope angle, whereby the main body 10 is slanted toward a reverse direction side in the travelling direction of the pushcart 1.

Then, the controller 21 determines whether or not a predetermined time has passed since having switched to the second control mode (s15), and returns to the first control mode after the predetermined time has passed (s16). In the processing of s15, the controller 21 may determine that the step has been negotiated in the case where a state in which the step detection sensor 25 does not detect the step (for example, a case of the height "h" being smaller than the threshold) has continued for more than a predetermine time, and return to the first control mode. Even in the case where the step detection sensor 25 detects the step after the predetermined time has passed, the controller 21 returns to the first control mode; however, the controller 21 does not switch to the second control mode until the step is no longer detected.

As discussed above, the pushcart 1 negotiates the step as shown in FIG. 4C, and again carries out the usual first control mode in which inverted pendulum control is made available. At the time of switching from the second control mode to the first control mode, the mode can return to the first control mode by gradually reducing the offset torque. Further, the offset torque can be adjusted in accordance with a change in the slope angle or angular velocity of the main body 10.

The controller 21 may carry out an operation to switch to the second control mode in the case where the user inputs the information of presence of a step using a switch or the like of the user I/F 27.

Figure 7A:
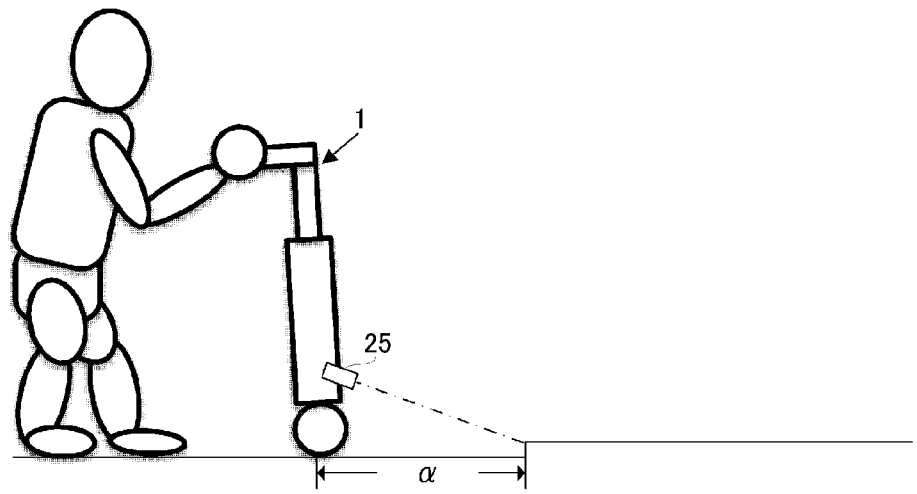
FIGS. 7A-7C include descriptive diagrams schematically illustrating operations of a first variation.
Figure 7B:
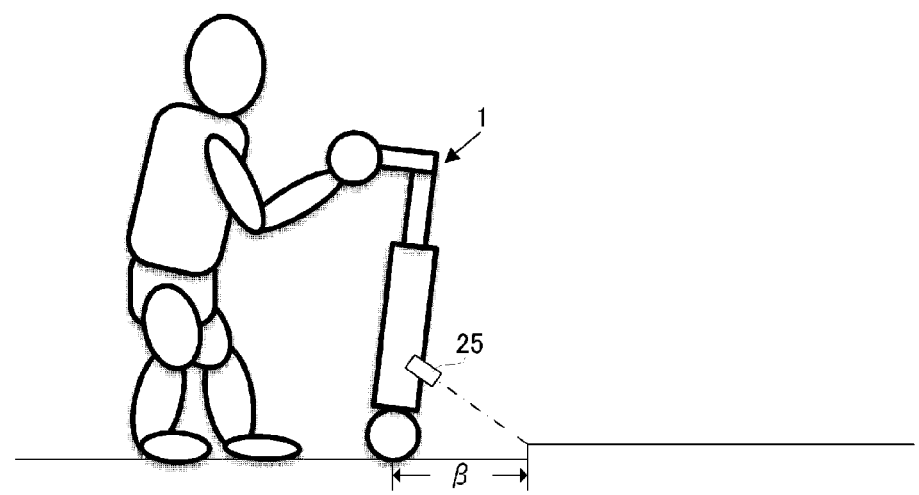
Figure 7C:
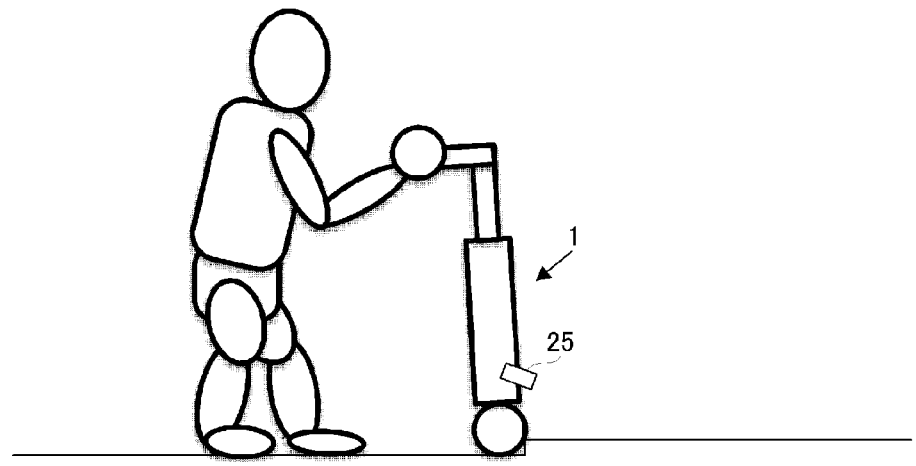

FIGS. 7A-7C include descriptive diagrams schematically illustrating operations of the pushcart 1 according to a first variation when negotiating a step.

In this example, by resetting the target slope angle of the main body 10 in the pitch direction toward the forward direction side in the travelling direction of the pushcart 1, the pushcart 1 is made to take a forward tilting posture as shown in FIG. 7B. By taking a forward tilting posture in this manner prior to switching to the second control mode, it is prevented that the slope angle of the main body 10 in the pitch direction is inclined toward the reverse direction side in the travelling direction, as shown in FIG. 7C.

In this case, such torque acts that causes the wheels to move forward through inverted pendulum control without necessarily offset torque being applied. With this, the pushcart moves faster than usual so as to be likely to negotiate the step.

Figure 8:
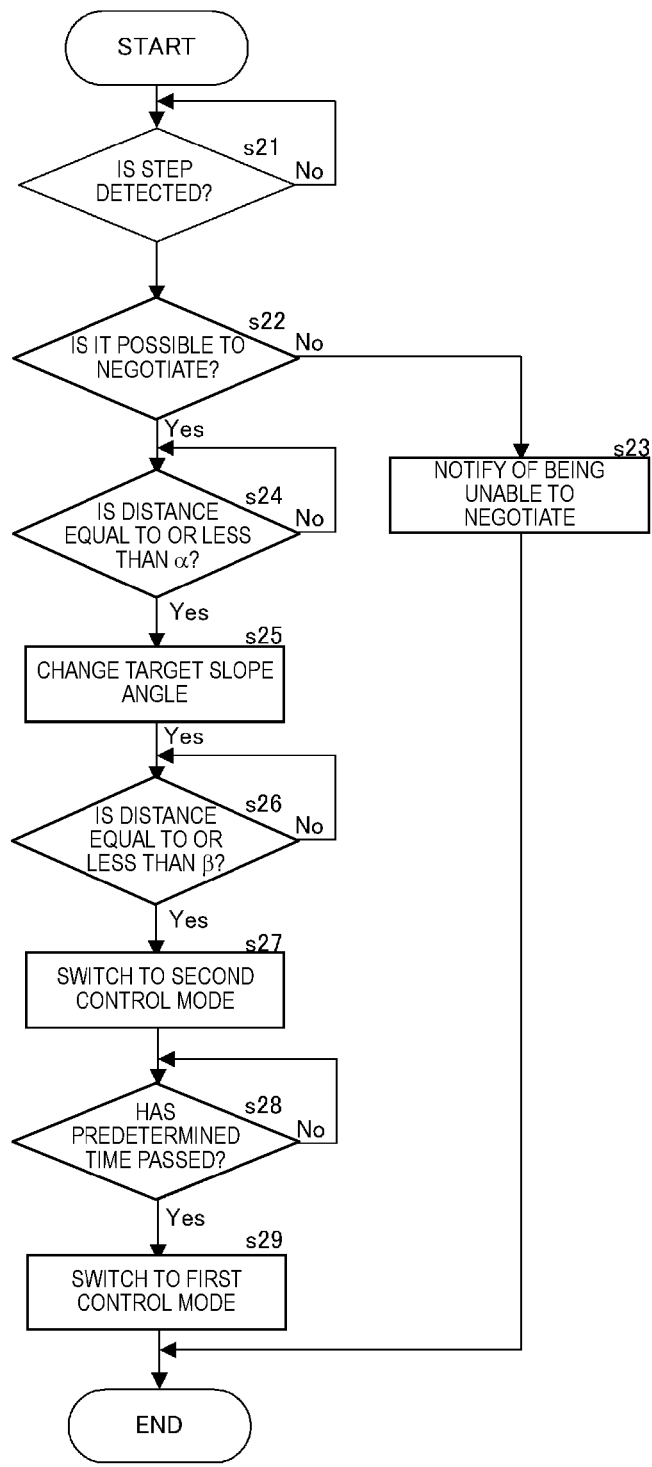
FIG. 8 is a flowchart illustrating operations of the first variation.

FIG. 8 is a flowchart illustrating operations of the pushcart 1 according to the first variation when negotiating a step. As shown in FIG. 7A, the controller 21 usually carries out the first control mode in which inverted pendulum control is made available. Then, in the case where the step detection sensor 25 detects a step (s21), the controller 21 determines whether or not the step has a negotiable height (s22). As a method for determining whether or not it is possible to negotiate the step, the method discussed with reference to FIG. 6 is used, for example. In the case where the step does not have a negotiable height, the controller 21 reports to the user that the pushcart is unable to negotiate the step (s23), and then ends the operation. Note that the processing of s22 is not absolutely necessary and may be omitted.

Meanwhile, in the case where the step is determined to be negotiable, the controller 21 determines whether or not a distance to the step is equal to or less than a first threshold α (s24). In the case where the distance to the step is determined to be equal to or less than the predetermined threshold α, the pushcart 1 is made to take a forward tilting posture as shown in FIG. 7B by resetting the target slope angle of the main body 10 toward the forward direction side in the travelling direction of the pushcart 1 (s25).

Subsequently, the controller 21 determines whether or not the distance to the step is equal to or less than a second threshold β (β<α) (s26). The controller 21 switches to the second control mode in the case where the distance to the step is determined to be equal to or less than the predetermined threshold β (s27). With this, offset torque is added so that the pushcart moves faster than in the case of the usual inverted pendulum control immediately in front of the step, as shown in FIG. 7C, whereby the pushcart is likely to negotiated the step. In this case, the slope angle of the main body 10 is prevented from being inclined toward the reverse direction side in the travelling direction.

Then, the controller 21 determines whether or not a predetermined time has passed since having switched to the second control mode (s28), and returns to the first control mode after the predetermined time has passed (s29). Also in this example, the controller 21 may determine that the step has been negotiated in the case where a state in which the step detection sensor 25 does not detect the step (for example, a case of the height "h" being smaller than the threshold) has continued for more than a predetermine time, and return to the first control mode. Even in the case where the step detection sensor 25 detects the step after the predetermined time has passed, the controller 21 returns to the first control mode; however, the controller 21 does not switch to the second control mode until the step is no longer detected.

Figure 9A:
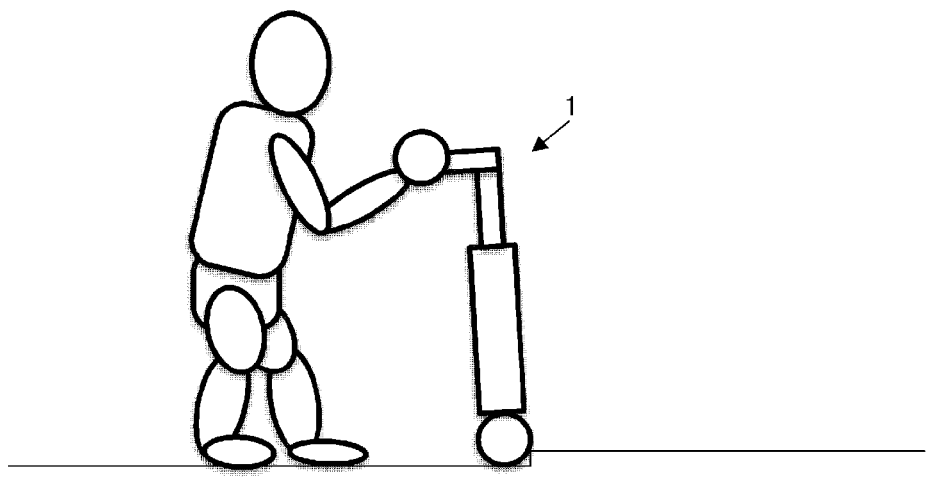
FIGS. 9A-9C include descriptive diagrams schematically illustrating operations of a second variation.
Figure 9B:
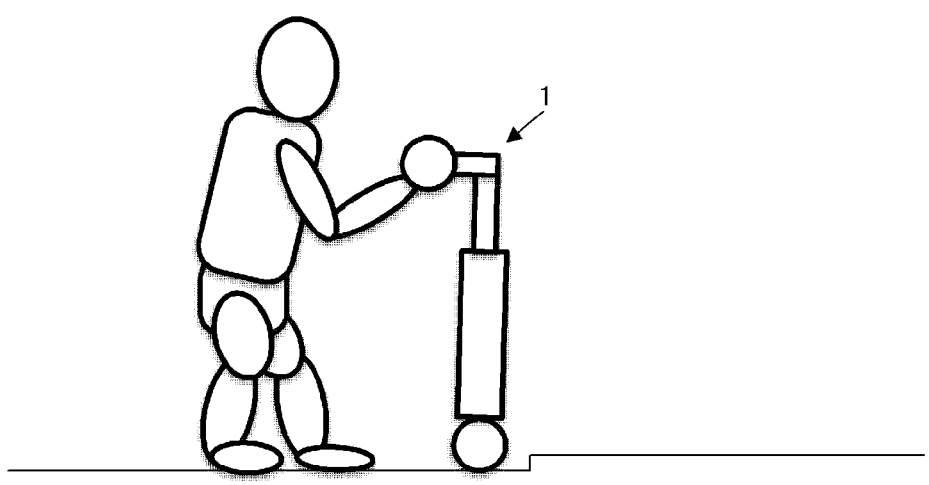
Figure 9C:
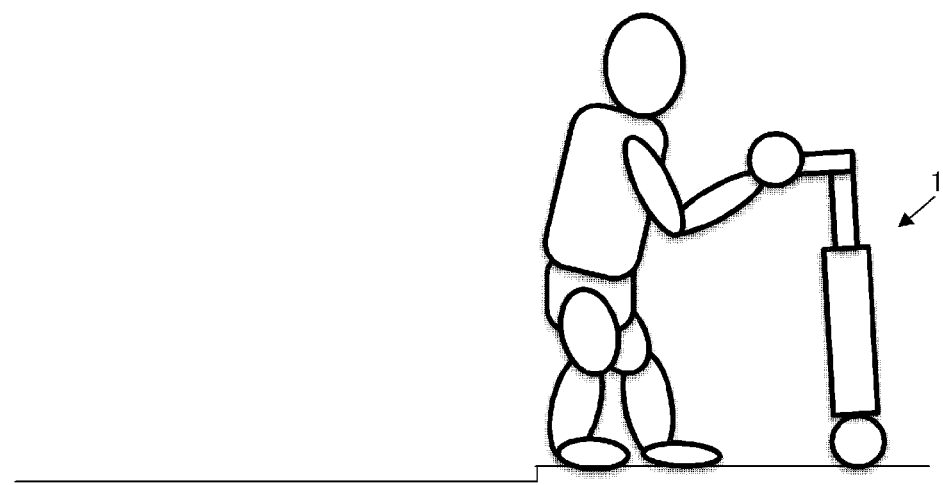

FIGS. 9A-9C include descriptive diagrams schematically illustrating operations of the pushcart 1 according to a second variation when negotiating a step.

In this example, a method for negotiating a step is described. That is, at the time of transition from the first control mode to the second control mode, the first control mode is stopped for a constant time, the wheels 11 are made to proceed backward in the travelling direction of the pushcart 1, and thereafter the transition to the second control mode is carried out so as to negotiate the step.

Further, in this example, the transition to the second control mode is carried out taking the detection of a bump against a step as a trigger. In this case, the step detection sensor 25 can adopt a shock sensor, an acceleration sensor, or the like for detecting an impact generated when the pushcart 1 makes contact with a step. It is also possible for the controller 21 to detect a bump against a step by using the slope angle sensor 20 or the rotary encoder 28. The angular velocity of the wheels 11 is substantially constant and does not exhibit a sudden change when the pushcart 1 is travelling on a flat ground. On the other hand, the angular velocity of the wheels 11 significantly changes (decreases) in the case where the pushcart 1 bumps against a step. Accordingly, the controller 21 calculates the angular velocity of the wheels 11 based on a value of the rotational angle of the wheels 11 inputted from the rotary encoder 28 and determines that the pushcart 1 has bumped against a step in the case where the angular velocity of the wheels 11 has suddenly changed. Further, when the pushcart 1 bumps against a step, the wheels 11 are temporarily stopped. As such, it may be determined that the pushcart 1 has bumped against a step in the case where an output change value of the rotary encoder 28 becomes 0. In this case, the rotary encoder 28 functions as a wheel stop detection unit for detecting the wheels being stopped. In addition, when the pushcart 1 bumps against a step, the slope angle of the main body 10 in the pitch direction also temporarily and significantly changes. As such, the controller 21 may determine that the pushcart 1 has bumped against a step in the case where a value of the slope angle inputted from the slope angle sensor 20 is suddenly changed. Further, the controller 21 may determine that the pushcart 1 has bumped against a step in the case where the acceleration of the main body 10 in the travelling direction or the angular velocity in the pitch direction is temporarily and suddenly changed.

Figure 10:
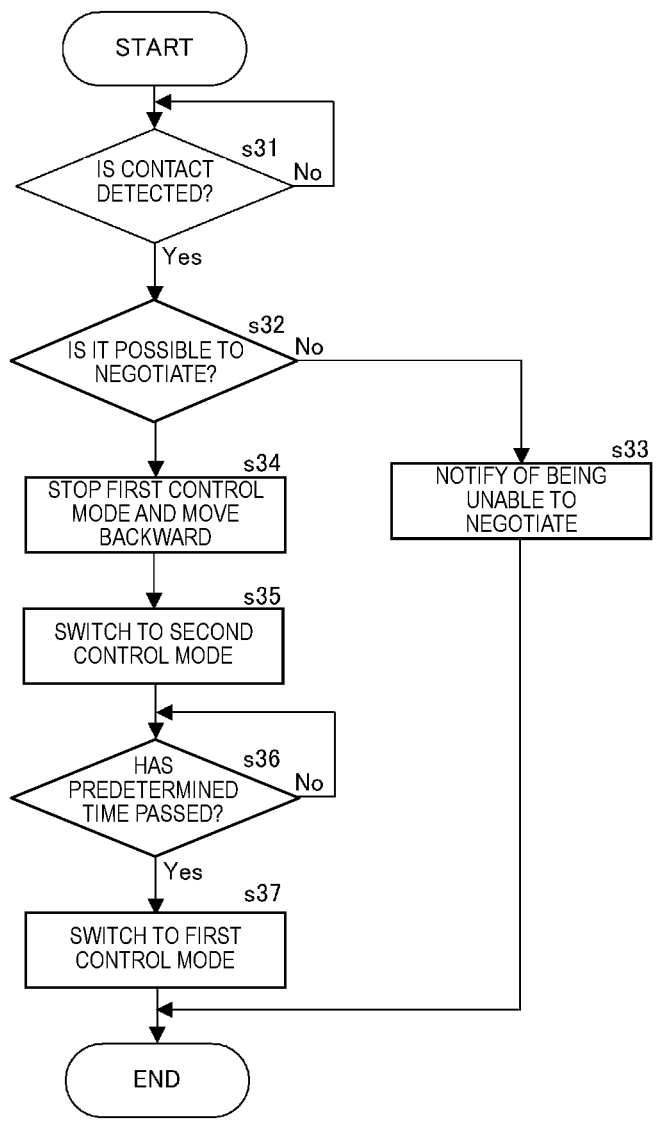
FIG. 10 is a flowchart illustrating operations of the second variation.

FIG. 10 is a flowchart illustrating operations of the pushcart 1 according to the second variation when negotiating a step. As shown in FIG. 9A, the controller 21 usually carries out the first control mode in which inverted pendulum control is made available. Then, in the case where a contact with a step is detected (s31), the controller determines whether or not the step has a negotiable height (s32). As a method for determining whether or not it is possible to negotiate the step, the method discussed with reference to FIG. 6 is used, for example. However, the processing of s32 is not absolutely necessary and may be omitted.

In the case where the step has a height not negotiable, the controller 21 reports to the user that the pushcart is unable to negotiate the step (s33), and then ends the operation.

On the other hand, in the case where the step is determined to be negotiable, the controller 21, as shown in FIG. 9B, stops the first control mode and makes the wheels 11 proceed backward in the travelling direction of the pushcart 1 (s34). Thereafter, the controller 21 switches to the second control mode (s35). This makes the pushcart 1 move faster immediately in front of the step, whereby the pushcart 1 is likely to negotiate the step.

Subsequently, the controller 21 determines whether or not a predetermined time has passed since having switched to the second control mode (s36), and returns to the first control mode after the predetermined time has passed (s37). In the manner discussed above, the pushcart 1 negotiates the step as shown in FIG. 9C, and again carries out the usual first control mode in which inverted pendulum control is made available.

Also in the second variation, the following aspect may be realized. That is, when a user inputs the information of presence of a step using a switch or the like of the user I/F 27, the first control mode is stopped for a constant time, the wheels 11 are made to proceed backward in the travelling direction of the pushcart 1, and thereafter the transition to the second control mode is carried out so as to negotiate the step.

Figure 11:
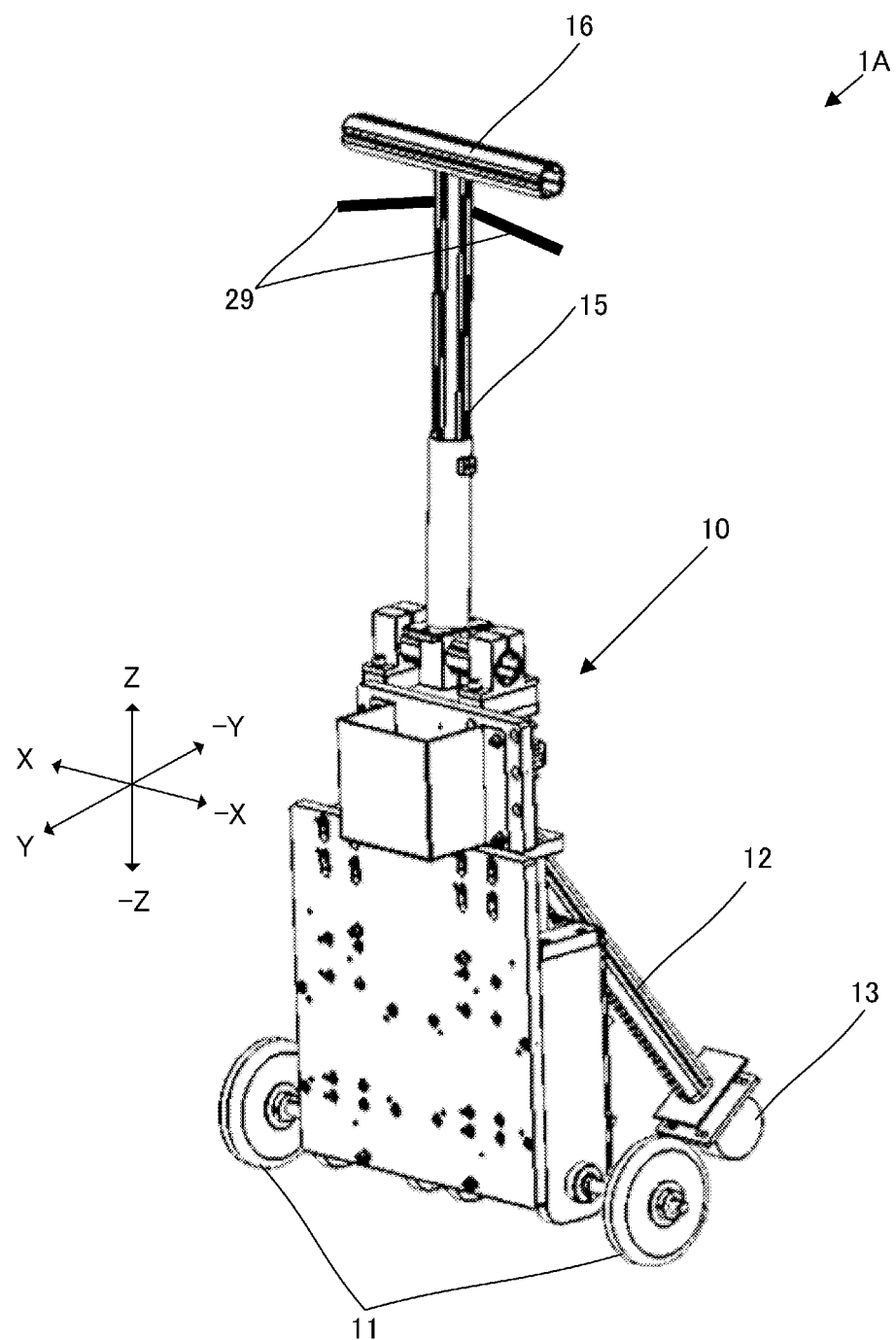
FIG. 11 is an external appearance of a pushcart according to an application example.

FIG. 11 is an external appearance of a pushcart 1A according to an application example. Note that constitutive elements common to FIG. 1 are given the same reference numerals as those in FIG. 1, and descriptions thereof are omitted herein. In the pushcart 1A according to the present application example, one end of a bar-like supporter 12 is attached to a rear surface of the main body 10 (in the −Y direction). The one end of the supporter 12 is connected to the main body 10 in a rotatable manner. An auxiliary wheel 13 is attached to the other end of the supporter 12. In the case where the main body 10 is largely slanted relative to the vertical direction, the supporter 12 makes contact with the ground to support the main body 10, thereby preventing the main body 10 from falling over. Although the auxiliary wheel 13 is not absolutely necessary in the present disclosure, providing the auxiliary wheel 13 gives the following advantage. That is, even in the case where the main body 10 is largely slanted relative to the vertical direction when the power supply is turned off, the pushcart 1A can be used as a pushcart due to the wheels 11 and the auxiliary wheel 13 being in contact with the ground. Further, two or more supporters 12 and auxiliary wheels 13 may be provided. In addition, the attachment position of the supporter 12 on the rear surface of the man body 10 may be set on the rotational shaft of the wheels 11.

Figure 12:
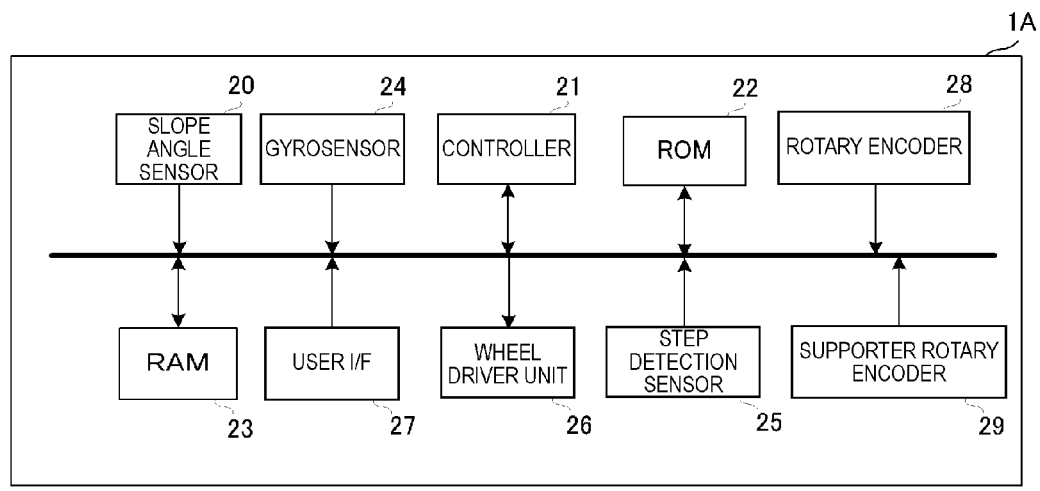
FIG. 12 is a control configuration diagram illustrating the configuration of the pushcart according to the application example.

FIG. 12 is a block diagram illustrating the configuration of the pushcart 1A according to the application example. Constitutive elements common to FIG. 2 are given the same reference numerals as those in FIG. 2, and descriptions thereof are omitted herein. The pushcart 1A according to the application example includes a supporter rotary encoder 29. The supporter rotary encoder 29 detects an intersecting angle formed by the main body 10 and the supporter 12, and outputs the detected result to the controller 21. The pushcart 1A according to the application example is a pushcart configured to perform inverted pendulum control in consideration of a slope angle of a ground surface using the supporter rotary encoder 29.

Figure 13:
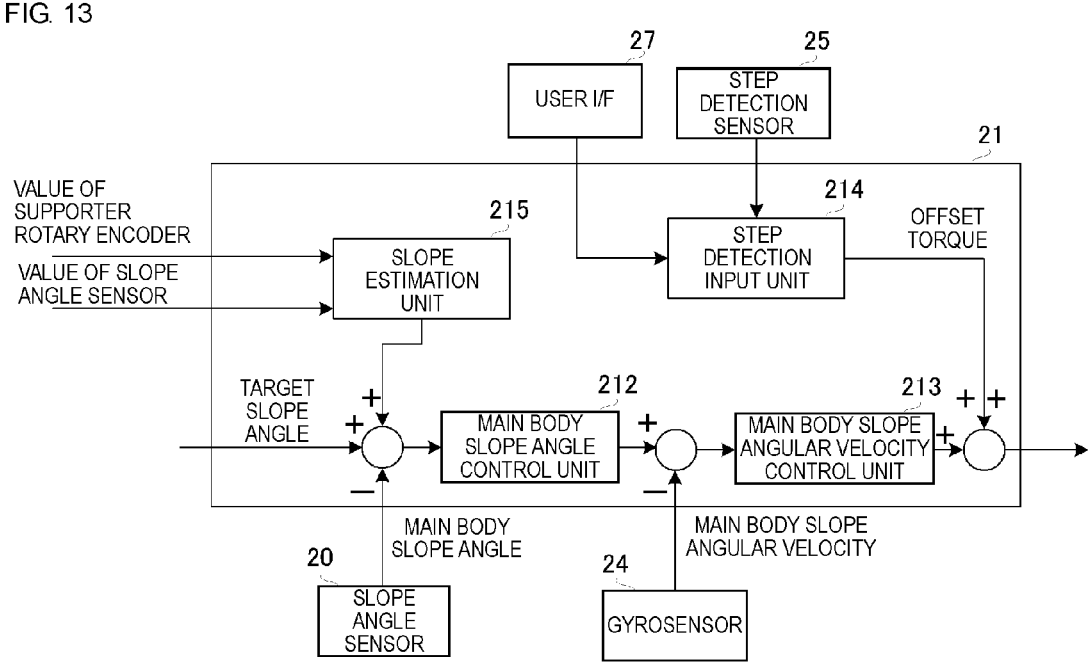
FIG. 13 is a block diagram illustrating a functional configuration of the controller 21.

FIG. 13 is a block diagram illustrating a functional configuration of the controller 21 according to the application example. Constitutive elements common to FIG. 3 are given the same reference numerals as those in FIG. 3, and descriptions thereof are omitted herein. The controller 21 includes a slope estimation unit 215. The slope estimation unit 215 inputs a value of the supporter rotary encoder 29 (that is, an intersecting angle formed by the main body 10 and the supporter 12) and a value of the slope angle sensor 20 (that is, a slope angle of the main body 10 relative to the vertical direction), and then estimates a ground surface slope angle.

Figure 14:
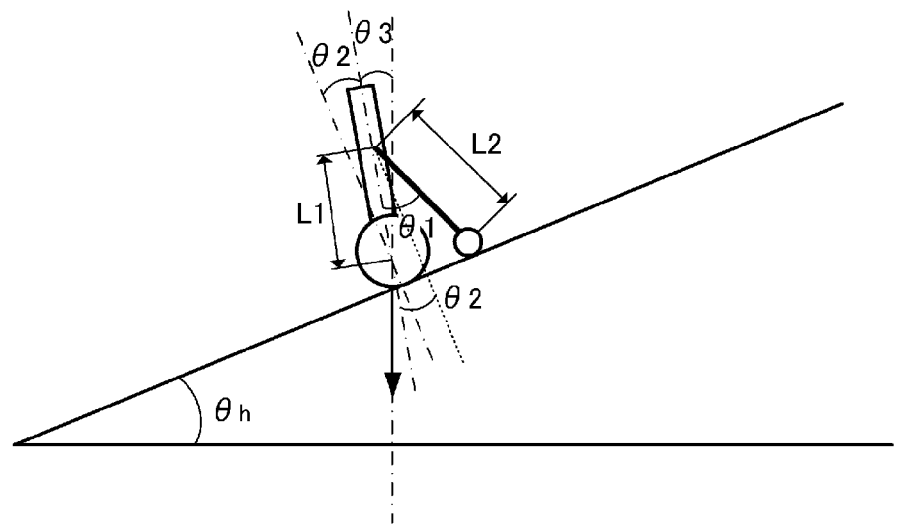
FIG. 14 is a diagram illustrating a relationship among a ground surface slope angle, a main body slope angle, and an intersecting angle.

As shown in FIG. 14, in the case where an intersecting angle formed by the main body 10 and the supporter 12 is taken as $\theta_1$, a slope angle of the main body 10 relative to a direction perpendicular to a ground surface is taken as $\theta_2$, a length of the main body 10 (length from the intersecting position of the main body 10 with the supporter 12 to the wheel 11) is taken as $L_1$, and a length of the supporter 12 (length from the intersecting position of the main body 10 with the supporter 12 to the auxiliary wheel 13) is taken as $L_2$, the slope angle $\theta_2$ of the main body 10 relative to a direction perpendicular to the ground surface can be obtained from a relation of $L_1 \cos \theta_2 = L_2 \cos (\theta_1 - \theta_2)$ using Formula 1 given below.

$$\theta_2 = \tan^{-1}\left(\frac{L_1 - L_2 \cos \theta_1}{L_2 \sin \theta_1}\right) \quad \text{[Formula 1]}$$

A ground surface slope angle $\theta_h$ can be obtained from a slope angle $\theta_3$ of the main body 10 relative to the vertical direction using a relation of $\theta_h = \theta_2 + \theta_3$.

The slope estimation unit 215 calculates an adequate correction angle based on the ground surface slope angle $\theta_h$ having been calculated using the above-described method. Through this, in the case where the pushcart 1A is forward proceeding on an upward slope, for example, by correcting the target angle so that the main body 10 is forward slanted relative to the vertical direction, a force that pulls a user can be obtained, thereby making it possible to climb the slope more comfortably. In another example, in the case where the pushcart 1A is forward proceeding on a downward slope, by correcting the target angle so that the main body 10 is backward slanted relative to the vertical direction, a force that pushes back the user can be obtained. This force acts as a braking effect so that the user can descend the slope more safely.

Figure 15:
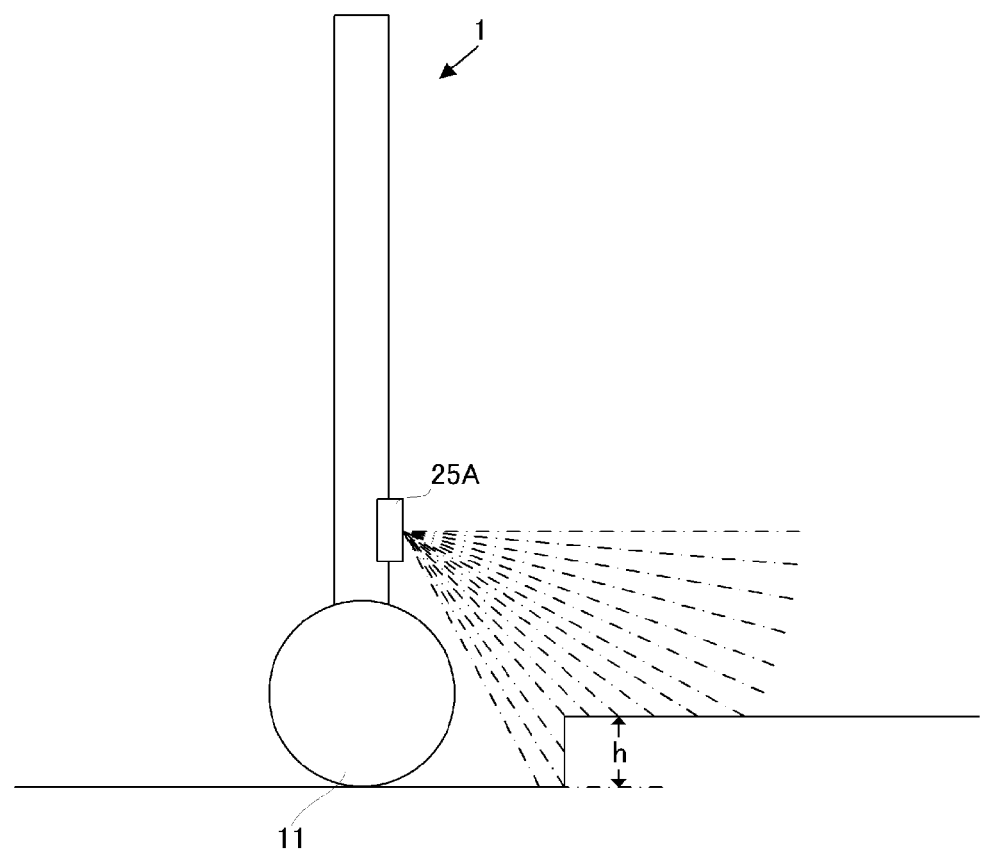
FIG. 15 is a diagram illustrating an application example of detecting a height.

FIG. 15 is a diagram illustrating an application example of detecting a height. In an example shown in FIG. 15, the pushcart 1 includes a scanner 25A capable of obtaining two-dimensional type information of the shape of an obstacle by changing a radiation angle of infrared light (alternatively, may be ultrasonic waves or the like). With this, the height "h" of the step can be detected in more detail. Although FIG. 15 illustrates an example in which infrared light is radiated while changing the radiation angle in an up-down direction, three-dimensional type information of the shape of the obstacle can be obtained by further including a scanner that radiates infrared light while changing the radiation angle in the right and left direction.

In the case where the scanner is installed on the main body 10, since the scanner swings in the pitch direction in response to the swing of the main body 10 in the pitch direction, there is a possibility that an actual angle at which the infrared light is radiated is deviated from the target radiation angle. However, because the swing amount is several degrees at most, the above-mentioned deviation may be taken as an error and ignored. Further, the slope angle of the main body 10 in the pitch direction may be detected using the gyrosensor 24 or the like and the radiation angle of the step detection sensor 25 may be corrected with the detected slope angle. Furthermore, an actuator for swinging the scanner in the pitch direction may be provided and the actuator may be driven in accordance with the detected slope angle to cancel out the swing of the main body 10 in the pitch direction.

Figure 16A:
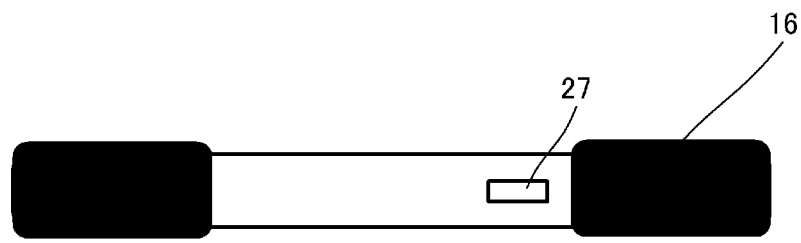
FIGS. 16A-16C include diagrams illustrating an example of a case in which a user inputs information of presence of a step using a user I/F 27 provided in a holding portion.
Figure 16B:
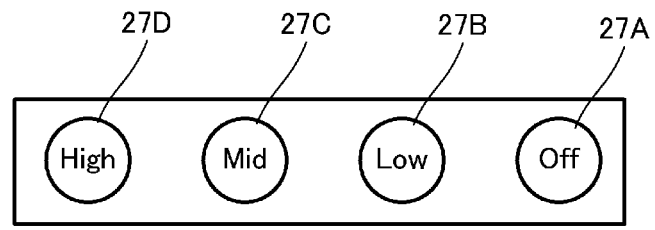
Figure 16C:
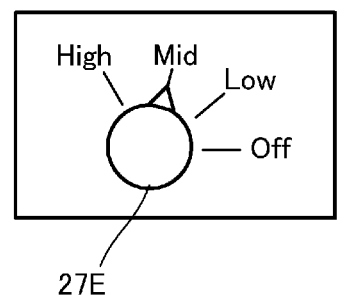

FIGS. 16A-16C include diagrams illustrating an example of a case in which a user inputs information of presence of a step using the user I/F 27 provided in a holding portion. As shown in FIG. 3, the step detection input unit 214 can be so embodied as to receive the information of presence of a step that the user inputs from the user I/F 27 provided in a holding portion 16. The user I/F 27 may be so embodied as to include a single switch; however, as shown in FIG. 16B, the user I/F 27 may be so embodied as to include a plurality of switches (a switch 27A, a switch 27B, a switch 27C, and a switch 27D).

In this case, the switch 27A is an Off-switch. When the user presses the switch 27A, the controller 21 carries out the first control mode in which inverted pendulum control is made available. When the user presses the switch 27B, 27C, or 27D, the controller 21 carries out the second control mode in which offset torque is added. The switch 27B is a Low-switch, and a relatively weak offset torque is added when this switch is pressed. The switch 27D is a High-switch, and a relatively strong offset torque is added when this switch is pressed. The switch 27C is a Mid-switch; when this switch is pressed, added is an offset torque that is stronger than the offset torque added when the switch 27B is pressed and weaker than the offset torque added when the switch 27D is pressed.

As shown in FIG. 16C, the user I/F 27 may be so embodied as to include a single rotational type switch 27E.

The rotational type switch 27E includes a potentiometer or an encoder. The controller 21 detects a rotational position of the rotational type switch 27E using the potentiometer or the encoder. In the case where the rotational position of the rotational type switch 27E is a position corresponding to "Off", the controller 21 carries out the first control mode in which inverted pendulum control is made available. In the case where the rotational position of the rotational type switch 27E is a position corresponding to "High", "Mid", or "Low", the controller 21 carries out the second control mode in which the offset torque is added. Similar to FIG. 16B, when the rotational position of the rotational type switch 27E is a position corresponding to "High", the controller 21 causes a relatively strong offset torque to be added; when the rotational position of the rotational type switch 27E is a position corresponding to "Low", the controller 21 causes a relatively weak offset torque to be added; when the rotational position of the rotational type switch 27E is a position corresponding to "Mid", the controller 21 causes an offset torque that is stronger than the case of "Low" and weaker than the case of "High" to be added.

The position of each of the switch 27B, the switch 27C, and the switch 27D among the plurality of switches shown in FIG. 16B returns to an initial state after being pressed. In the case where the rotational type switch (a potentiometer or an encoder) as shown in FIG. 16C is in use, the position of the switch returns to a rotational position corresponding to "Off". A method for the switch to return to the initial state can be realized by a built-in elastic member such as a spring, for example.

Figure 17:
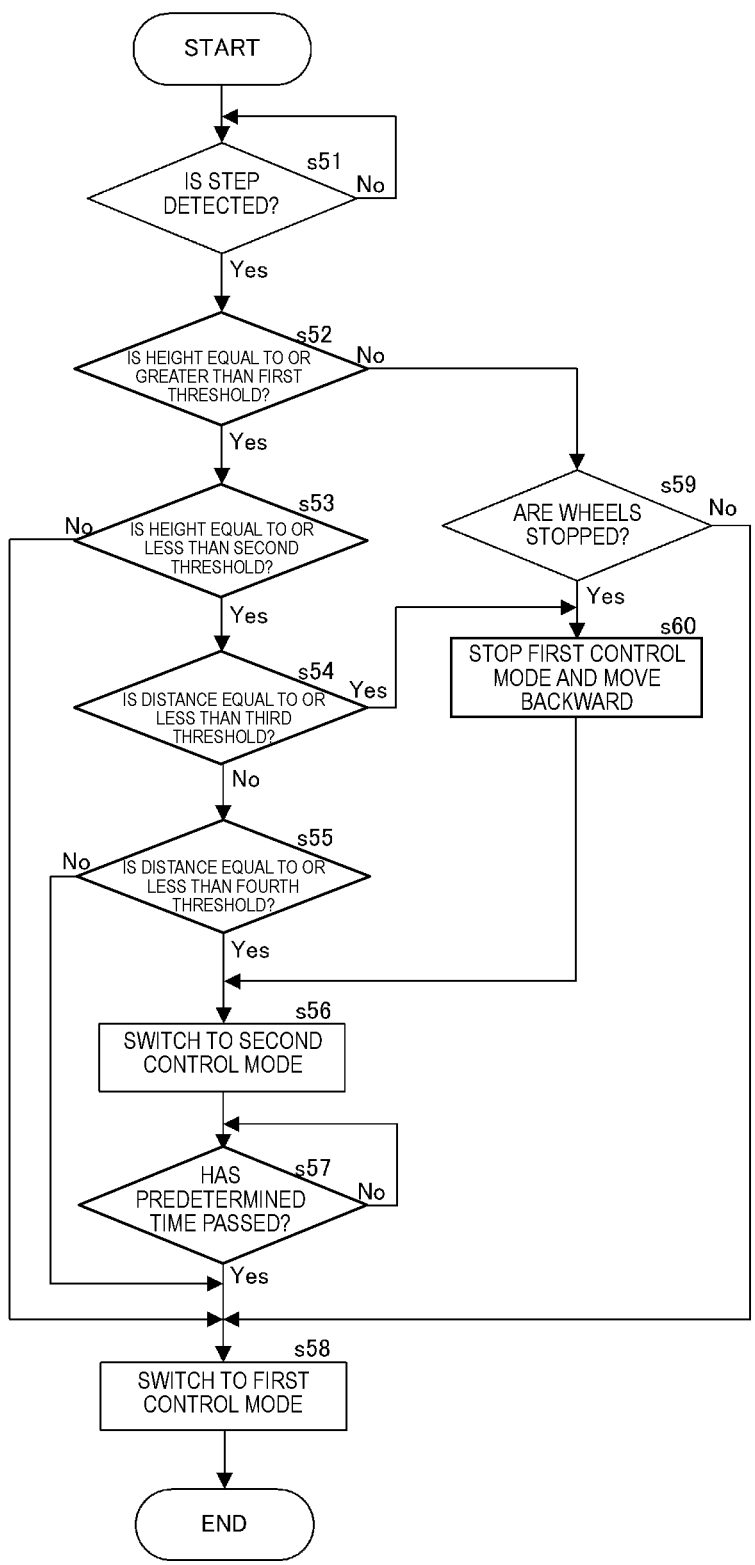
FIG. 17 is a flowchart illustrating operations of the controller 21 in the case where a height of a step and a distance to the step are detected in detail.

FIG. 17 is a flowchart illustrating operations of the controller 21 in the case where a height of a step and a distance to the step are detected in detail. In the case where a step is detected by the step detection sensor 25 (or the scanner 25A) (s51), the controller 21 determines whether or not the height of the step is equal to or greater than a first threshold (s52). The first threshold is set to such a value of height that can be considered to be a level ground. In the case where the height of the step is lower than the first threshold, the controller 21 further determines whether or not the wheels 11 are stopped (s59). In the case where the wheels are not stopped, the pushcart is determined to be travelling on a level ground, and the current control state is maintained. In other words, the first control mode is maintained (s58).

Meanwhile, in the case where the wheels 11 are stopped, even if the step is low, the controller 21 determines that the current state is such that the pushcart has bumped against the step and is unable to proceed; the controller 21 stops the first control mode to make the wheels 11 proceed backward in the travelling direction of the pushcart 1 for a predetermined time or by a predetermined distance (s60), and thereafter switches to the second control mode (s56).

In s52, in the case where the height of the step is determined to be equal to or greater than the first threshold, the controller 21 determines that the step exists, and further determines whether or not the height of the step is equal to or less than a second threshold (s53). The second threshold is set to a value corresponding to a negotiable height for the wheels 11. The controller 21 maintains the current state if the step has a height not negotiable (s58). The controller 21 may report to the user that the pushcart is unable to negotiate the step, and then end the operation.

In the case where the height of the step is determined to be equal to or less than the second threshold, the controller 21 determines the step to be negotiable, and further determines whether or not a distance to the step is equal to or less than a third threshold (s54). The third threshold is set to a value corresponding to a distance to be considered such that the pushcart is too close to the step to proceed within that distance. In the case where the distance to the step is determined to be equal to or less than the third threshold, the controller 21 stops the first control mode to make the wheels 11 proceed backward in the travelling direction of the pushcart 1 for a predetermined time or by a predetermined distance (s60), and thereafter switches to the second control mode (s56).

Meanwhile, in the case where it is determined that the distance to the step exceeds the third threshold, the controller 21 further determines whether or not the stated distance is equal to or less than a fourth threshold (s55). The fourth threshold is set to a value corresponding to a distance to be considered such that the wheels 11 will not reach the step even if the transition to the second control mode is carried out because the distance to the step is too long. The controller 21 maintains the current state if the distance to the step exceeds the fourth threshold (s58); if the distance to the step is equal to or less than the fourth threshold, the controller 21 switches to the second control mode (s56). That is, only in the case where the distance to the step falls within a predetermined range, the controller 21 switches from the first control mode to the second control mode.

Subsequently, the controller 21 determines whether or not a predetermine time has passed since having switched to the second control mode (s57), and returns to the first control mode after the predetermined time has passed (s58). As discussed thus far, the controller 21 detects the height of and the distance to the step in detail, and switches between the first control mode and the second control mode.

REFERENCE SIGNS LIST

1 PUSHCART
1A PUSHCART
10 MAIN BODY
11 WHEEL
12 SUPPORTER
13 AUXILIARY WHEEL
15 SUPPORTING POLE
16 GRIP
20 SLOPE ANGLE SENSOR
21 CONTROLLER
22 ROM
23 RAM
24 GYROSENSOR
25 STEP DETECTION SENSOR
26 WHEEL DRIVER UNIT
27 USER I/F
28 ROTARY ENCODER
212 MAIN BODY SLOPE ANGLE CONTROL UNIT
213 MAIN BODY SLOPE ANGULAR VELOCITY CONTROL UNIT
214 STEP DETECTION INPUT UNIT

The invention claimed is:

1. A pushcart comprising:
a wheel;
a driver unit for driving the wheel;
a controller for controlling operations of the driver unit;
a main body configured to support the wheel in a rotatable manner;
a holding portion provided on the main body;
a first sensor unit for detecting an angle change or an angular velocity change in a slope angle of the main body in a pitch direction; and a step detection input unit configured to receive information of presence/absence of step detection, wherein the controller has a first control mode in which the operations of the driver unit are controlled so that the angle change in the slope angle of the main body in the pitch direction relative to a target value becomes 0 based on output of the first sensor unit and a second control mode in which torque applied to the driver unit is large in comparison with the first control mode, and the controller switches between the first control mode and the second control mode based on output of the step detection input unit.

2. The pushcart according to claim 1,
wherein the second control mode resets the target value of the slope angle of the main body in the pitch direction toward a forward direction side in a travelling direction of the pushcart.

3. The pushcart according to claim 2,
wherein the second control mode adds a predetermine amount of torque in accordance with an amount of change in output of the first sensor unit after having reset the target value of the slope angle of the main body in the pitch direction in addition to torque that the controller applies to the driver unit in the first control mode.

4. The pushcart according to claim 3, wherein, at a time of transition from the first control mode to the second control mode, the first control mode is stopped for a constant time, the wheel is made to proceed backward in the travelling direction of the pushcart, and thereafter the transition to the second control mode is carried out.

5. The pushcart according to claim 2,
wherein, at a time of transition from the first control mode to the second control mode, the first control mode is stopped for a constant time, the wheel is made to proceed backward in the travelling direction of the pushcart, and thereafter the transition to the second control mode is carried out.

6. The pushcart according to claim 2,
wherein the step detection input unit includes a switch provided in the holding portion.

7. The pushcart according to claim 1,
wherein the second control mode adds a predetermined amount of torque in accordance with an amount of change in output of the first sensor unit in addition to the torque that the controller applies to the driver unit in the first control mode.

8. The pushcart according to claim 7,
wherein, at a time of transition from the first control mode to the second control mode, the first control mode is stopped for a constant time, the wheel is made to proceed backward in the travelling direction of the pushcart, and thereafter the transition to the second control mode is carried out.

9. The pushcart according to claim 1,
wherein, at a time of transition from the first control mode to the second control mode, the first control mode is stopped for a constant time, the wheel is made to proceed backward in the travelling direction of the pushcart, and thereafter the transition to the second control mode is carried out.

10. The pushcart according to claim 1,
wherein the step detection input unit includes a switch provided in the holding portion.

11. The pushcart according to claim 1,
wherein the step detection input unit includes a potentiometer, an encoder, or a plurality of switches provided in the holding portion.

12. The pushcart according to claim 11,
wherein the potentiometer, the encoder, or the plurality of switches, after having received step detection input, return to an initial state.

13. The pushcart according to claim 11,
wherein the second sensor unit includes a wheel stop detection unit for detecting the wheel being stopped.

14. The pushcart according to claim 13,
wherein the wheel stop detection unit is a rotary encoder configured to detect a number of rotations of the wheel and detects the wheel being stopped in accordance with an output value of the rotary encoder.

15. The pushcart according to claim 12,
wherein the second sensor unit includes a shock sensor.

16. The pushcart according to claim 12,
wherein the second sensor unit includes a distance measurement sensor, and
the controller determines, based on a distance to a step detected by the distance measurement sensor, whether or not the step is negotiable.

17. The pushcart according to claim 16,
wherein, in the case where the distance to the step detected by the distance measurement sensor falls within a predetermined range, the controller switches from the first control mode to the second control mode.

18. The pushcart according to claim 1,
wherein the step detection input unit includes a second sensor unit for detecting a step.

19. The pushcart according to claim 18,
wherein the second sensor unit is a step height detection sensor for detecting a height of a step, and when the step height detection sensor detects a step having a height that is equal to or higher than a predetermined threshold, the controller determines that there exists a step and switches from the first control mode to the second control mode.

20. The pushcart according to claim 19,
wherein, in the case where it is determined that there exists a step, the controller determines whether or not the step is negotiable based on height information of the step detected by the step height detection sensor, and switches from the first control mode to the second control mode only when the step is determined to be negotiable.

* * * * *